United States Patent Office 3,118,911
Patented Jan. 21, 1964

3,118,911
N-PHENOXYETHYLFURFURYLAMINES AND TETRAHYDROFURFURYLAMINES
Jean Druey, Riehen, and Karl Schenker, Basel, Switzerland, assignors to Ciba Corporation, New York, N.Y., a corporation of Delaware
No Drawing. Filed Apr. 18, 1962, Ser. No. 188,570
Claims priority, application Switzerland May 3, 1961
8 Claims. (Cl. 260—347.7)

The present invention relates to new secondary amines. More especially it concerns amines of the formula

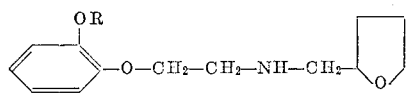

where R represents a lower aliphatic hydrocarbon radical—and their salts.

The lower aliphatic hydrocarbon radical R is for example a lower unbranched or branched alkyl or alkenyl radical bound in any desired position, for example an allyl, n-propyl, isopropyl, butyl, secondary butyl, amyl, isoamyl or hexyl, or above all a methyl or ethyl group.

The new compounds and their salts possess a distinct sympathicolytic effect accompanied by sedative action. They can therefore be used pharmacologically or as medicaments for animals and human beings above all as sedatives.

Of special value are the N-[β-(ortho-methoxy-phenoxy)-ethyl]-tetrahydrofurfurylamine of the formula

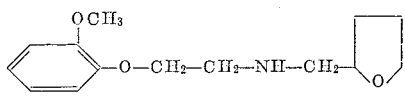

and its salts.

The new amines are obtained by known methods; advantageously, a phenolether of the formula

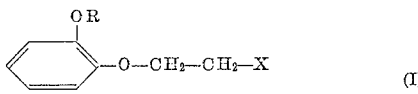

where X' represents a halogen atom is reacted with tetrahydrofurfurylamine.

A halogen atom is especially a chlorine, bromine or iodine atom.

According to another process, in a compound of the formula

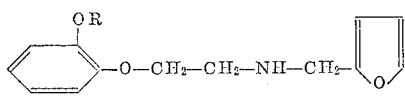

wherein R has the meaning given above—the furan ring is reduced, for example with hydrogen in the presence of a catalyst, such as a nickel catalyst, for example Raney nickel.

The afore-mentioned reactions are carried out in known manner, in the presence or absence of diluents and/or condensing agents, at room temperature or an elevated temperature, under atmospheric or super-atmospheric pressure.

Depending on the reaction conditions used the new compounds are obtained in the form of their bases or of their salts. The salts yield by known methods the free amine bases. The latter can be reacted with acids suitable for the formation of therapeutically valuable salts to form salts, such, for example, as those of the hydrohalic acids, such as hydrochloric or hydro-bromic acid, perchloric, nitric or thiocyanic acid, sulfuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methanesulfonic, ethanesulfonic, hydroxyethanesulfonic, benzenesulfonic, para-toluenesulfonic, naphthalenesulfonic or sulfanilic acid, or methionine, trypthophan, lysine or arginine.

The salts of the new compounds can also serve for the purification of the resulting bases, in that the bases are converted into the salts, the latter separated, and the bases liberated therefrom.

The starting materials are known or can be made by known methods. N-[β-(ortho-methoxy-phenoxy)-ethyl]-furfurylamine and its salts are new and likewise form an object of the present invention; they are obtained by a suitable application of the process described above.

The invention further includes any variant of the present process in which an intermediate obtainable at any stage of the process, for example a Schiff's base, is used as starting material and the remaining step or steps is/are carried out, or the process is discontinued at any stage thereof, or the starting materials are formed under the reaction conditions or are used in the form of salts thereof.

The new compounds are intended to be used as medicaments, for example in the form of pharmaceutical preparations containing them or their salts in admixture with an organic or inorganic, solid or liquid pharmaceutical excipient suitable for enteral or parenteral administration. Suitable excipients are substances that do not react with the new compounds such, for example, as water, gelatine, lactose, starches, magnesium stearate, talc, vegetable oils, benzyl alcohols, gums, polyalkylene glycols, cholesterol or other known medicinal excipients. The pharmaceutical preparations may be, for example, tablets or dragees, or in liquid form solutions, suspensions or emulsions. They may be sterilized and/or may contain assistants such as preserving, stabilizing, wetting or emulsifying agents, salts for regulating the osmotic pressure, or buffers. They may also contain other therapeutically useful substances. The preparations are formulated by known methods. The new compounds may also be used as ingredients of animal fodder or of additives to such fodder.

The following examples illustrate the invention.

*Example 1*

A mixture of 18.7 grams (0.1 mol) of β-(ortho-methoxyphenoxy)-ethylchloride, 20.2 grams (0.2 mol) of tetrahydrofurfurylamine and 30 cc. of isopropanol is refluxed for 18 hours, then evaporated, and the residue is taken up in methylene chloride and agitated successively with 100 cc. of 2 N-sodium hydroxide solution and with 2 x 50 cc. of water. The chloroformic solution is dried over sodium sulfate and then evaporated, and the residue is distilled in a high vacuum, to yield the N-[β-(ortho-methoxyphenoxy)-ethyl]-tetrahydrofurfurylamine of the formula

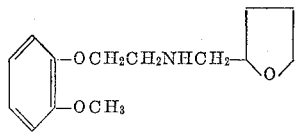

as a colorless viscous liquid boiling at 128° C. under 0.07 mm. Hg pressure. The hydrochloride is prepared with hydrogen chloride in ethyl acetate; after recrystallization from ethyl acetate it melts at 102–104° C.

*Example 2*

A solution of 24.7 grams (0.1 mol) of N-[β-(ortho-methoxyphenoxy)-ethyl]-furfurylamine in 150 cc. of ethanol is catalytically hydrogenated in the presence of 5 grams of Raney nickel in an autoclave under 100 atmospheres hydrogen pressure at 50–80° C. The hydrogenation product is distilled in a high vacuum. The product obtained in this manner is identical with the N-[β-(ortho-methoxyphenoxy)-ethyl]-N-tetrahydrofurfurylamine obtained in Example 1.

The N-[β-(ortho-methoxyphenoxy)-ethyl]-furfurylamine used as starting material is obtained in the following manner:

A mixture of 18.7 grams (0.1 mol) of ortho-methoxyphenoxy-ethylchloride, 38.4 grams (0.4 mol) of furfurylamine and 50 cc. of isopropanol is refluxed for 15 hours. The dark-colored solution is evaporated in a water-jet vacuum, and the residue is taken up in methylene chloride and agitated with 100 cc. of 2 N-sodium hydroxide solution and then with 2 x 50 cc. of water. The methylene chloride solution is dried over anhydrous sodium sulfate, and the solvent and excess furfurylamine are distilled off. The residue is dissolved in a small amount of benzene and chromatographed on a column of 400 grams of alumina of activity II. Elution with benzene+methyl chloride yields the N-[β-(ortho-methoxyphenoxy)-ethyl]-furfurylamine of the formula

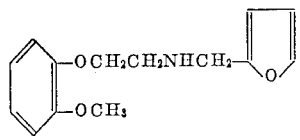

as a pale-yellow, viscous oil.

The hydrochloride is prepared in the usual manner; on recrystallization from alcohol+ether acetate it forms slightly brownish crystals melting at 112–113° C.

What is claimed is:
1. A secondary amine of the formula

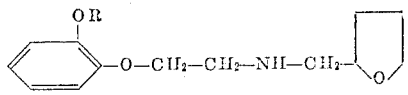

wherein R represents a member selected from the group consisting of lower alkyl and lower alkenyl.

2. An acid addition salt of a compound claimed in claim 1.

3. A secondary amine of the formula

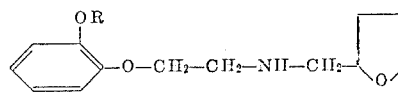

wherein R represents lower alkyl.

4. An acid addition salt of a compound claimed in claim 3.

5. The N-[β-(o-methoxyphenoxy)-ethyl]-tetrahydrofurfurylamine of the formula

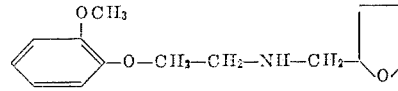

6. An acid addition salt of the compound claimed in claim 5.

7. The N-[β-(o-methoxyphenoxyl)-ethyl]-N-furfurylamine.

8. An acid addition salt of the compound claimed in claim 7.

References Cited in the file of this patent
UNITED STATES PATENTS
2,852,562     Surrey _____ Sept. 16, 1958

OTHER REFERENCES

Braun et al.: Berichte, volume 51 (1918), at page 79 of pages 79–96.

UNITED STATES PATENT OFFICE
CERTIFICATE OF CORRECTION

Patent No. 3,118,911                      January 21, 1964

Jean Druey et al.

It is hereby certified that error appears in the above numbered patent requiring correction and that the said Letters Patent should read as corrected below.

Column 4, line 27, for "-(o-methoxyphenoxyl)-" read -- -(o-methoxyphenoxy)- --.

Signed and sealed this 9th day of June 1964.

(SEAL)
Attest:

ERNEST W. SWIDER
Attesting Officer

EDWARD J. BRENNER
Commissioner of Patents